July 10, 1956  D. C. MAIN  2,753,729
POWER TRANSMISSION MECHANISMS
Filed Aug. 9, 1952  4 Sheets-Sheet 3

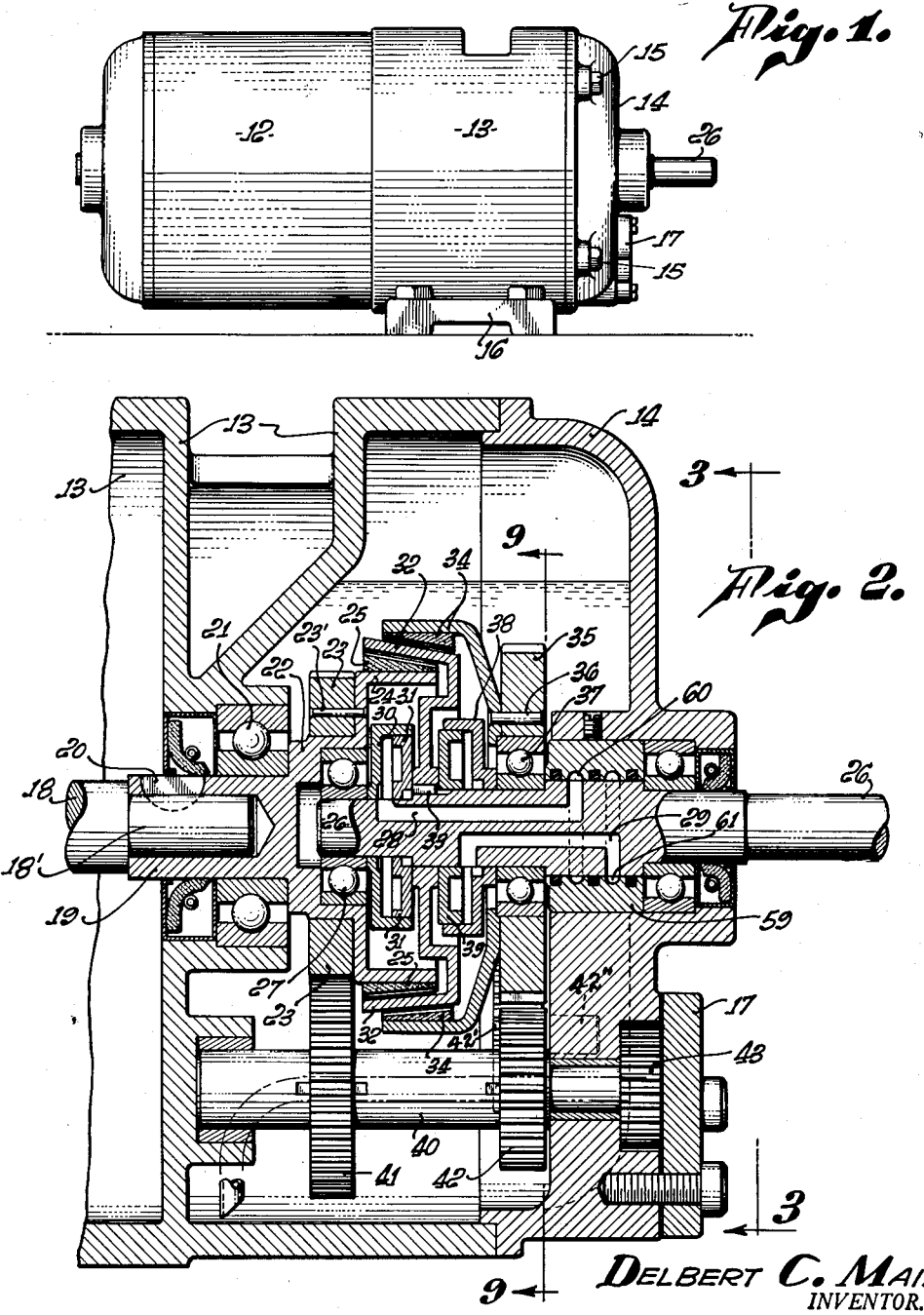

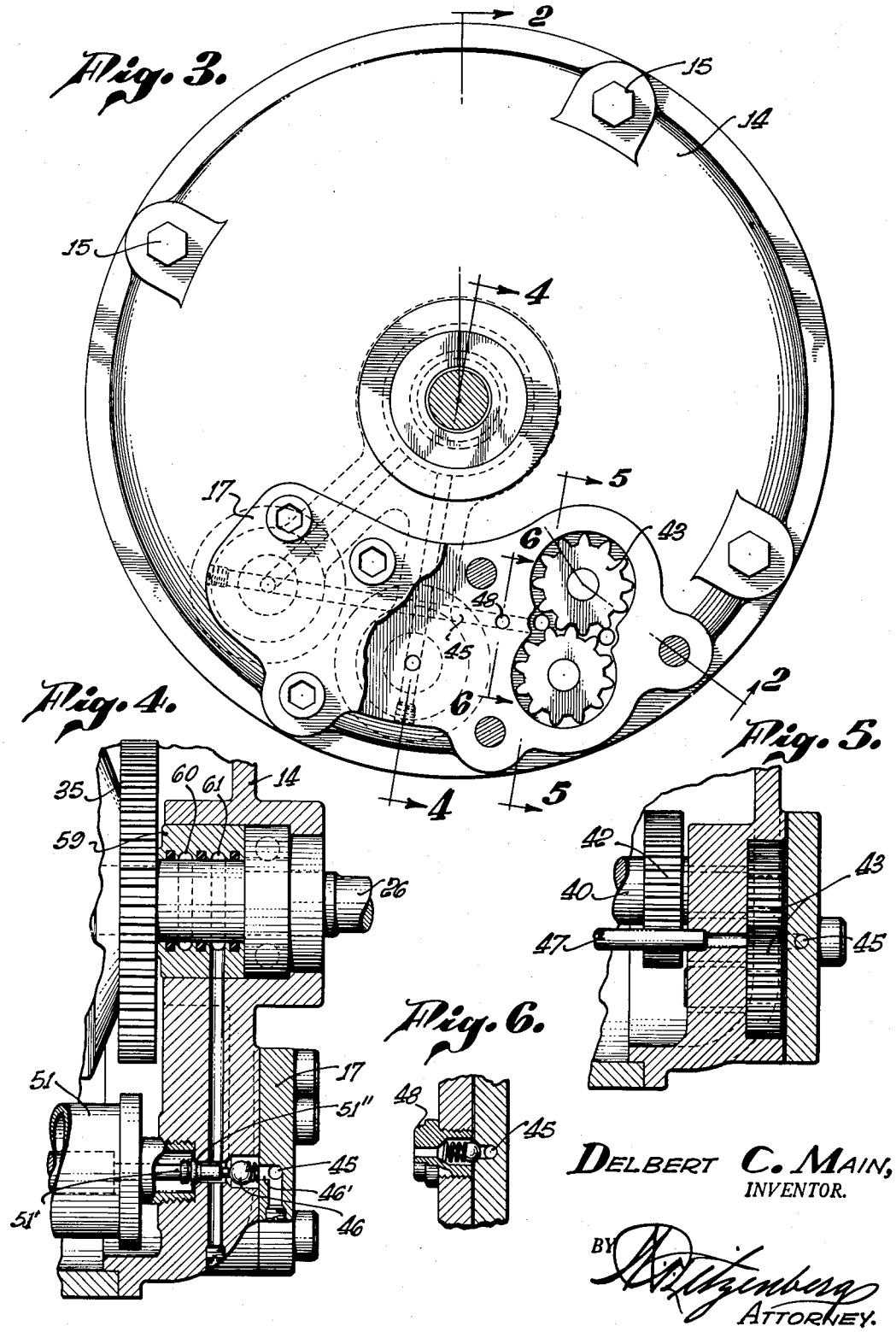

DELBERT C. MAIN,
INVENTOR.

BY
ATTORNEY.

July 10, 1956 D. C. MAIN 2,753,729
POWER TRANSMISSION MECHANISMS
Filed Aug. 9, 1952 4 Sheets-Sheet 4

DELBERT C. MAIN,
INVENTOR.

ATTORNEY.

United States Patent Office 2,753,729
Patented July 10, 1956

2,753,729

POWER TRANSMISSION MECHANISMS

Delbert C. Main, Glendale, Calif.

Application August 9, 1952, Serial No. 303,572

9 Claims. (Cl. 74—377)

This invention relates to power transmission mechanisms, and more particularly to improvements which make possible, between a motor-driven shaft and a work or output shaft, a transmission mechanism whereby it is possible to reverse the direction of rotation of the output or work shaft as many as one hundred and twenty times per minute, while the motor continues to run in one direction only.

This is accomplished by a system of clutches and gears, interposed between said power shaft and said work or output shaft, with control means therefor, whereby instant reversal of the work shaft is made possible with convenience and ease.

Among the salient objects of the invention are:

To provide in a mechanism of the character referred to a system of clutches and gears, with control therefor, whereby instant reversal of the output or work shaft is made possible, practical and efficient;

To provide as one type of control for such a mechanism, a hydraulic system in which the control valves thereof are moved electrically to control the flow or direction of the hydraulic fluid which moves the controlling clutch elements, thus making it certain and efficient;

To provide improvements in the clutch cones or cups whereby to increase the efficiency of said clutch elements in accomplishing the rapid or instant reversal of the work or output shaft;

To provide in a mechanism of the character referred to means whereby a two-speed drive can be had for the output or work shaft.

Other objects and purposes of the invention will be disclosed in connection with a more detailed description of one practical embodiment thereof, taken in connection with the accompanying four sheets of drawings, which I will now describe.

Figure 1 is a side elevation of the invention enclosed, in connection with a motor;

Figure 2 is a vertical sectional view, enlarged, taken on the angled line 2—2, on Fig. 3;

Figure 3 is a front elevation, at the position of the line 3—3, on Fig. 2, with a cover part broken away;

Figure 4 is a fragmentary sectional view taken on line 4—4 on Figure 3;

Figure 5 is a fragmentary sectional view of the pump, as seen on line 5—5, Fig. 3;

Figure 6 is a sectional detail showing a pressure relief valve, taken on line 6—6, Fig. 3;

Figures 7, 8:
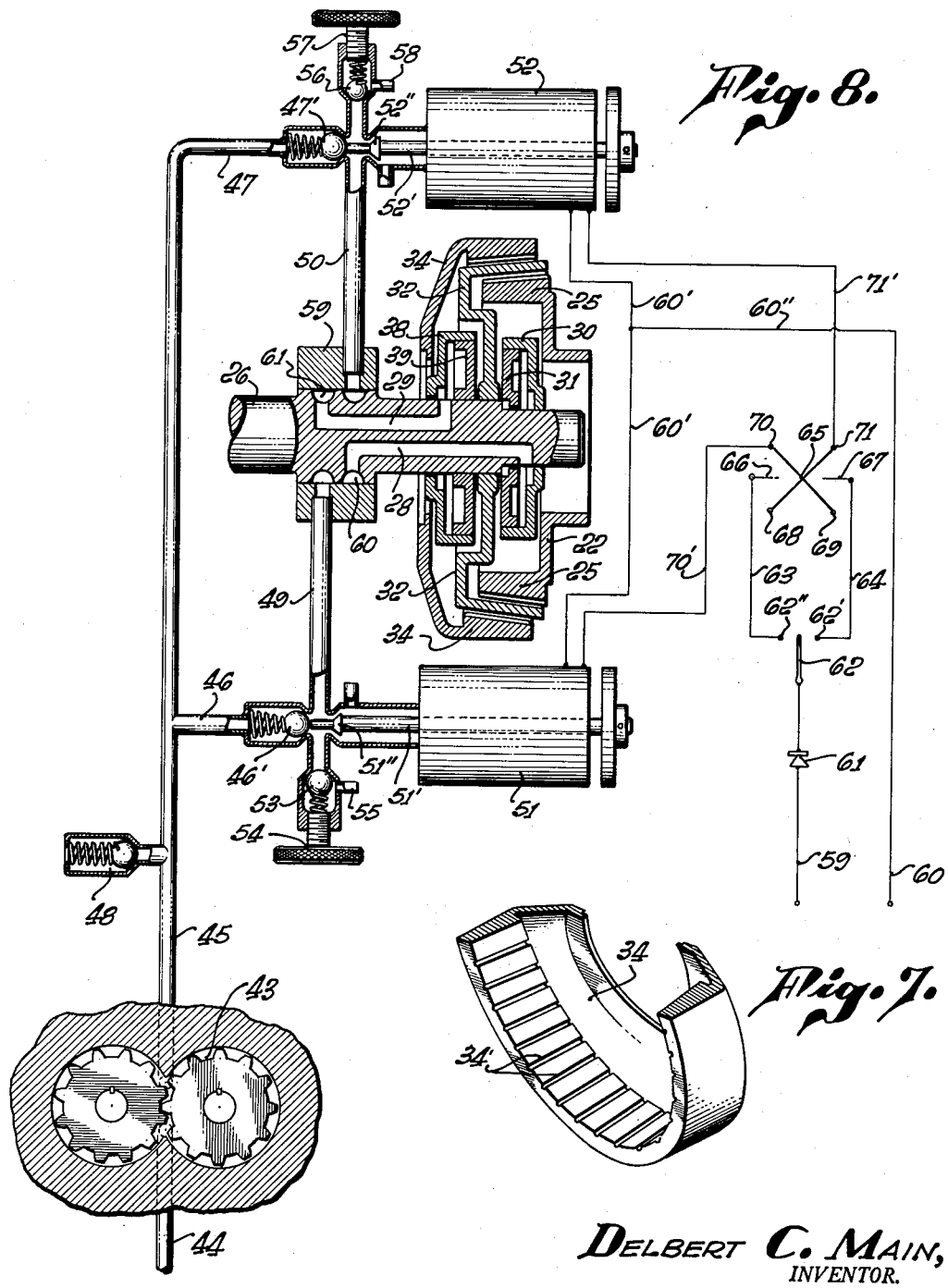
Figure 7 is a fragmentary perspective view showing the inner face of a clutch cup.
Figure 8 is a diagrammatic view showing a hydraulic pump, with connections to the clutch elements, shown in section, and also showing the solenoids, with electric connections for moving the valves.
Figure 9:
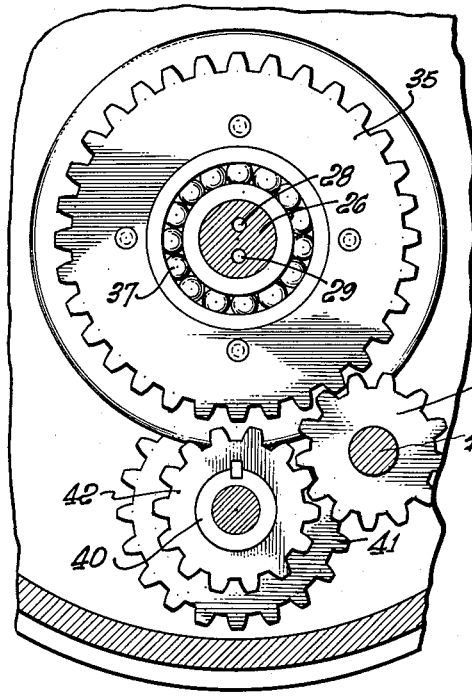
Figure 9 is a sectional view taken on line 9—9, Fig. 2, showing intermeshing gears.

Referring in detail to the drawings, the motor casing is designated 12, and the casing or housing for the power transmission mechanism is designated 13, with a removable head or cap 14, secured in place by the screw bolts 15, 15. Said housing 13 is shown on a base 16, and said head or cap 14 is shown with a removable cover part 17, partly broken away in Fig. 3.

The motor or driving shaft is designated 18, having a reduced end 18' on which is mounted a special operating member having its smaller sleeve portion 19, on said shaft end 18', with a key 20, and with a ball-bearing 21 therefor, as seen in Fig. 2. The next larger portion of said operating member is designated 22, and is provided with a gear 23 secured thereto, as by means of rivets 23'. On the largest cup portion 24, that is: on the outer periphery thereof, is mounted a clutch element 25, of tapering form, shown in section in Fig. 2.

The output or work shaft is designated 26, and has its inner end in a ball-bearing 27, within the portion 22, of the special operating member, as clearly indicated in Fig. 2. Said output or work shaft 26, in its inner portion, is provided with two by-pass bores or passageways, as 28 and 29. An outer cylinder element, as 30, is mounted on said shaft 26, with a movable piston element 31, within said outer cylinder element, as shown. The outlet end of said by-pass 28 is shown between said outer and inner elements 30 and 31, to supply hydraulic fluid through said by-pass therebetween, whereby to move the inner piston element 31 to the right to move a middle or intermediate clutch element 32, slidable on said shaft 26, with a key 33 for turning said clutch element with said shaft and allowing it to be moved back and forth thereon, for engagement with the first clutch element 25, mentioned above, to engagement with a third clutch element 34, mounted on the side of a gear 35, by rivets, as 36, with a ball-bearing 37 interposed between said gear 35 and said shaft 26, as seen in Fig. 2.

Mounted on said shaft 26, between said gear 35 and the middle or intermediate clutch element 32, is a second cylinder element 38, with a piston element 39 therein, similar to the elements 30 and 31. Cylinder element 38 is mounted on said shaft 26 against said gear 35, and within clutch element 34, secured to said gear 35. Piston element 39 is mounted on said shaft 26, within cylinder element 38, as shown, and bears against said middle clutch element 32, and is movable by hydraulic means, again referred to, for moving said driven or middle clutch element 32 into operating engagement with the clutch element 25, or clutch element 34, to be driven thereby for driving shaft 26.

By-pass 29, in shaft 26, as seen in Fig. 2, has one end in communication between said cylinder and piston elements 38 and 39, for moving piston element 39, and clutch element 32, into driving engagement with clutch element 25, secured to and driven with gear 23, secured to the special operating member 22.

Thus as piston element 31 is moved by hydraulic pressure, through by-pass 28, into engagement with the middle clutch element 32, said middle clutch element is moved into engagement with the outer clutch element 34, to drive it and the gear 35, to which it is secured.

Figure 10:
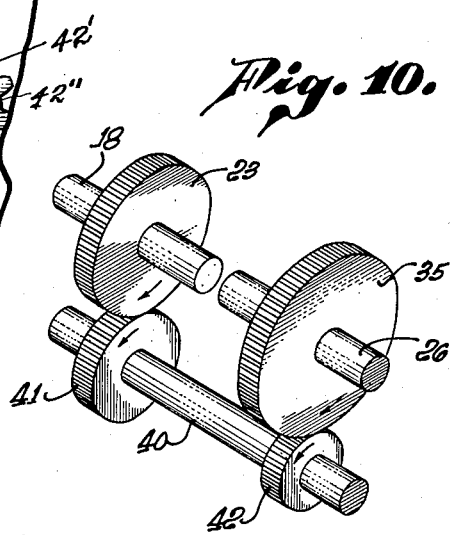
Figure 10 is a perspective view of the gears and their shafts, without the clutch mechanism, indicating one driving gear connection from the power shaft to the work or output shaft, and indicating a two speed arrangement.
Figure 11:
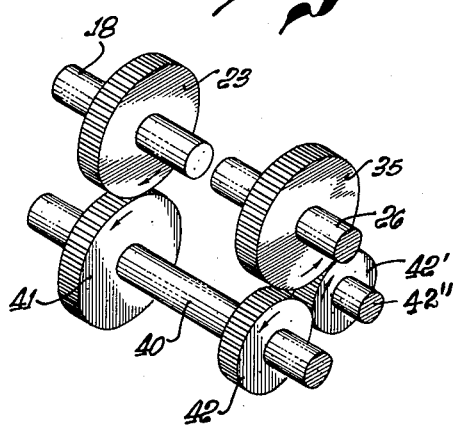
Figure 11 is a similar view in which is included a reversing gear for reversing the direction of the output or work shaft.

In the lower part of said housing 13, is a countershaft 40, on which is keyed a gear 41, in mesh with gear 23, as seen in Fig. 2. Also on said shaft 40, is a gear 42, which is in mesh with gear 42' on a stub shaft 42". The gear 42' is in mesh with gear 35, to which clutch element 34 is secured, as shown. Gear 42' is a reversing gear. Gear 42 is smaller than gear 41, on the same shaft, and gear 35 is larger than gear 23. These gears are shown in diagrammatic perspective view in Fig. 10, without the clutch mechanism which would be interposed between the end of shaft 18, and the end of shaft 26, as seen in Fig. 2. By shifting the middle or intermediate clutch element 32, one way or the other, change of drive to the work shaft 26 can be secured, and by shifting said middle clutch member to the right, in engagement with clutch element 34, a reversal of said work shaft is secured. The reversing gear arrangement is shown in diagrammatic view in Fig. 11.

In Fig. 7 I have shown a fragmentary portion of a clutch cup or element in order to show how the gripping face is provided with grooves 34', in order to lubricate the engaging clutch faces for greater efficiency.

I will now describe the hydraulic feature of the invention and by means of which the clutch element 32 is moved to change the speed, or to reverse the direction of rotation of the work shaft.

Referring particularly to Fig. 8, an oil pump is designated 43, with an inlet or supply pipe 44, leading thereto and a pipe 45 leading therefrom with two branches, as 46 and 47, said pipe 45 also has connected therewith a pressure relief valve, as 48, consisting of a spring-held ball valve, as shown. Branch pipe 46 is provided with a spring pressed ball valve 46', controlling communication with pipe 49. Branch pipe 47 is also provided with a spring pressed ball valve 47', controlling communication with a pipe 50. As a means for opening said valves 46' and 47' at will, two solenoids, as 51 and 52 are provided, having plunger elements, as 51' and 52' therein, the outer ends of said plungers terminating in valve elements, as 51'' and 52'', the extended ends of which are positioned to engage the ball valves 46' and 47', when it is desired to admit hydraulic pressure from the pump through pipes 49 or 50, and to the clutch mechanism before described.

To the lower end of the pipe 49, is also connected a spring-loaded ball valve, as 53, with an adjustment screw 54, for regulating the tension of the spring, whereby to increase pressure required to open said ball valve and permit escape of pressure through a vent 55. Similarly, the upper end of pipe 50, is shown provided with a spring loaded valve, as 56, with adjustment screw 57 for regulating the tension of the spring, whereby to increase pressure to open said ball valve and permit escape of pressure through a vent 58.

The pipes 49 and 50, connect into an oil delivery sleeve or member, as 59, in which are annular channels, as 60 and 61, communicating with the ends of the by-passes 28 and 29, respectively, as indicated in Fig. 8.

With this arrangement, as illustrated in Fig. 8, it is possible to control the amount of torque, because the amount of hydraulic pressure in the clutch cylinders 30 and 38, determines the amount of torque transmitted to the work shaft 26. With this pressure regulating valve mechanism, 53 and 56, it is possible to control the amount of torque applied to said work shaft 26, from the maximum delivered from the power shaft, to the minimum of zero. That is, by increasing the tension of valve springs at 53 and 56, the hydraulic pressure transmitted for operating the clutch elements is increased with a corresponding increase in the torque delivered to the work shaft 26.

I will now describe the electric control for the solenoids which operate the control valves in the diagrammatic view in Fig. 8.

An alternating source of electric energy is to be connected with the lines 59 and 60, which include a rectifier 61, and a remote control single pole, double throw switch 62, which would be mechanically operated, as by a moving part of a machine being operated.

From this switch and two contacts 62' and 62'', lines 63 and 64 are shown connected with a double pole, double throw toggle switch, designated as a whole 65.

Two manually movable switch elements 66 and 67, to be moved together into engagement with two contacts 68 and 69, or with two contacts 70 and 71, for the purpose of energizing solenoids 51 or 52, as will be understood from the diagrammatic view in Fig. 8.

Thus by the simple manual manipulation of the electric switch 65, either solenoid 51 or 52 can be energized for the purpose of opening the valve which controls the flow of hydraulic fluid to move the piston elements 31 or 39, as before described.

The switch element 62 would be connected for operation by the movement of a machine element or part, moving back and forth, whereby said switch element would be moved by the machine element. For example, in a tapping machine, as the tap reaches its down position, it must be returned, and its down movement would operate to move switch element 62. This is what is meant by being operated by mechanical movement of switch element 62.

Assuming that switch element 62 has been moved to the right contact element 62', and that switch elements 66 and 67 are down to the contact elements 68 and 69, the current then flows through line 59, switch 62, line 64, switch element 67, contact 69, contact 70, line 70', to solenoid 51 and back through line 60', 60'' and 60 to complete the circuit which energizes solenoid 51.

If the movement of the machine now moves switch element 62 to the left, to contact 62'', then the circuit is through lines 59, 63, switch 66, contact 68, contact 71, line 71' to solenoid 52, and back through line 60' to return line 60'' to line 60.

Thus I have provided a practical and efficient power transmission mechanism, with electric control of the valves which control the flow of hydraulic fluid for operating clutch elements for driving a work shaft from a power driven shaft, and in which the direction of rotation of said work shaft can be rapidly changed, and also in which a two speed drive can be had for said work shaft.

I have also provided an improved construction and arrangement of clutch elements, with a movable clutch member therebetween, to be moved by said hydraulic power from one position to another; that is, said clutch member can be rapidly and efficiently moved from one clutch element to the other clutch element for changing the drive-direction or speed, of the work shaft as may be required for the best results from said power transmission mechanism.

I have also provided a construction and arrangement which is compact and efficient, with a type of cylinder with piston therein, with means for directing the hydraulic fluid between the cylinder and its piston, whereby to force the piston outwardly against the clutch member for moving the latter into driving engagement with another clutch element.

Other objects and advantages of the invention will be apparent from the foregoing detailed description of one practical embodiment thereof, taken with the detailed drawings, and I do not limit the invention to the details of construction and arrangement shown for purposes of explanation, except as I may be limited by the hereto appended claims forming a part of this application.

I claim:

1. The combination with a power driven shaft and a work shaft operatively supported in axial alinement therewith, of a power transmission mechanism therebetween for transmitting power from said power driven shaft to said work shaft, said power transmitting mechanism including: a gear driven by said power shaft, said gear having a cup-like clutch element secured axially to its side and turning therewith, a gear rotatably mounted on said work shaft and having secured axially to its side a cup-like clutch element, to turn therewith, an intermediate clutch member shiftably mounted axially on said work shaft, between said two clutch elements, for turning said work shaft from either of said clutch elements, as it is moved into driving engagement therewith, means for shifting said intermediate clutch member into driving engagement with either of said clutch elements for driving said work shaft, said means including a cylinder and piston mounted axially, one within the other, on said work shaft at one side of said intermediate clutch member, a second cylinder and piston mounted axially, one within the other, on said work shaft at the other side of said intermediate clutch member, said pistons being movable axially in said cylinders by hydraulic power for moving said intermediate clutch member in either direction, and means for selectively directing hydraulic fluid under pressure into said cylinders for moving said pistons, and intermeshing gears from the gear driven by said power shaft to the gear rotatably mounted on said work shaft.

2. A power transmission mechanism as set forth in claim 1, in which the gear drive from the gear driven by said power shaft to the gear rotatably mounted on said work shaft includes a reversing gear for driving said work shaft in the opposite direction from said power shaft and the gear driven thereby.

3. A power transmission mechanism as set forth in claim 1, in which the means for selectively directing hydraulic fluid under pressure into said cylinders for moving said pistons includes electrically operated valves for controlling the flow of said hydraulic fluid to said cylinders.

4. The combination with a power shaft and a driven shaft in axial alignment with each other, of power transmission mechanism for transmitting power from one to the other and including in combination a clutch element on the power shaft, a clutch element on the driven shaft, and an intermediate, shiftable clutch element between said first mentioned clutch elements, a cylinder with piston therein, mounted axially, one within the other, between said first clutch element and said intermediate clutch element, and a second cylinder with piston therein, between said intermediate clutch element and said clutch element on said driven shaft, a source of hydraulic fluid under pressure, said driven shaft having by-pass bores therethrough for conveying said fluid to said cylinders for moving said intermediate clutch element into operating engagement with either of said other clutch elements for transmitting power from one to the other, said clutch elements, said cylinders and said pistons therein all being axially aligned, said shiftable clutch element and said pistons being axially movable on said driven shaft.

5. A power transmission mechanism as set forth in claim 4, which includes means for reversing the direction of rotation of the driven shaft.

6. A power transmission mechanism as set forth in claim 4, in which the clutch elements are of cup form, the intermediate clutch element engaging the inner surface of the clutch element on the driven shaft in one position and engaging the exterior of the clutch element on the power shaft in its other position.

7. In combination with a power shaft and a driven shaft, in axial alignment with each other, the power shaft having a gear and a first cup clutch element on its end, the driven shaft having an intermediate cup clutch element thereon, and shiftable axially on said driven shaft, said driven shaft also having thereon a gear with a second cup clutch element secured to said gear and overlying said intermediate clutch element, a first cylinder with a first piston therein on said driven shaft between said first clutch element and said intermediate clutch element for moving said intermediate clutch element, and a second cylinder with a second piston therein on said driven shaft between said intermediate clutch element and said second clutch element on said gear of said driven shaft, whereby said intermediate clutch element is shiftable into driving engagement with either said first or second clutch elements, and hydraulic mechanism for selectively operating said first and second pistons and thereby said intermediate clutch element.

8. A mechanism as set forth in claim 7, which includes electrically operated valves for controlling said hydraulic mechanism for selectively operating said intermediate clutch element.

9. A mechanism as set forth in claim 7, which also includes a gear train interposed between said first and second clutch elements and operative to change the direction of rotation of said driven shaft upon shifting movement of said intermediate clutch element from engagement with one of said first or second clutch elements into engagement with the other of said first or second clutch elements.

References Cited in the file of this patent

UNITED STATES PATENTS

| | | |
|---|---|---|
| 688,516 | Harris | Dec. 10, 1901 |
| 2,231,465 | Emrick | Feb. 11, 1941 |
| 2,438,216 | Jessen | Mar. 23, 1948 |
| 2,452,775 | Lindsley | Nov. 2, 1948 |
| 2,484,538 | Vanderzee | Mar. 15, 1949 |